US010167360B2

(12) United States Patent
Martinez et al.

(10) Patent No.: US 10,167,360 B2
(45) Date of Patent: Jan. 1, 2019

(54) PROCESS TO PRODUCE POLYOLEFIN IONOMERS AND IONOMERS PRODUCED THEREBY

(71) Applicants: Dow Global Technologies LLC, Midland, MI (US); Regents of the University of Minnesota, Minneapolis, MN (US)

(72) Inventors: Henry Martinez, Minneapolis, MN (US); Marc A. Hillmyer, Minneapolis, MN (US); Jeffrey C. Munro, Bellaire, TX (US); Kim L. Walton, Lake Jackson, TX (US); Morgan M. Hughes, Angleton, TX (US)

(73) Assignees: Dow Global Technologies LLC, Midland, MI (US); Regents of the University of Minnesota, Minneapolis, MN (US)

( * ) Notice: Subject to any disclaimer, the term of this patent is extended or adjusted under 35 U.S.C. 154(b) by 154 days.

(21) Appl. No.: 15/111,178

(22) PCT Filed: Dec. 15, 2014

(86) PCT No.: PCT/US2014/070261
§ 371 (c)(1),
(2) Date: Jul. 12, 2016

(87) PCT Pub. No.: WO2015/108642
PCT Pub. Date: Jul. 23, 2015

(65) Prior Publication Data
US 2016/0333140 A1    Nov. 17, 2016

Related U.S. Application Data

(60) Provisional application No. 61/927,099, filed on Jan. 14, 2014.

(51) Int. Cl.
*C08G 61/08* (2006.01)

(52) U.S. Cl.
CPC ......... *C08G 61/08* (2013.01); *C08G 2261/12* (2013.01); *C08G 2261/1412* (2013.01); *C08G 2261/1644* (2013.01); *C08G 2261/3322* (2013.01); *C08G 2261/418* (2013.01); *C08G 2261/72* (2013.01); *C08G 2261/724* (2013.01)

(58) Field of Classification Search
CPC ............... C08G 61/08; C08G 2261/12; C08G 2261/1412; C08G 2261/1644; C08G 2261/3322; C08G 2261/418; C08G 2261/72; C08G 2261/724
See application file for complete search history.

(56) References Cited

U.S. PATENT DOCUMENTS

| 3,267,083 A | * | 8/1966 | Imhof ................. C08K 5/0025 |
| | | | 260/DIG. 31 |
| 3,333,024 A | | 7/1967 | Haefele et al. |
| 3,415,789 A | | 12/1968 | Coover et al. |
| 3,595,942 A | | 7/1971 | Wald et al. |
| 3,700,633 A | | 10/1972 | Wald et al. |
| 3,810,957 A | | 5/1974 | Lunk et al. |
| 5,028,665 A | | 7/1991 | Hucul |
| 5,612,422 A | | 3/1997 | Hucul et al. |
| 5,654,253 A | | 8/1997 | Hucul et al. |
| 6,090,359 A | | 7/2000 | Hucul |
| 6,153,714 A | * | 11/2000 | Bansleben ............. C08G 61/06 |
| | | | 526/171 |
| 6,376,622 B1 | | 4/2002 | Hucul |
| 6,395,841 B1 | | 5/2002 | Calverley et al. |
| 6,399,538 B1 | | 6/2002 | Hucul |
| 6,486,264 B1 | * | 11/2002 | Tsunogae ............... C08G 61/08 |
| | | | 525/332.1 |
| 2013/0172493 A1 | | 7/2013 | Luo et al. |

FOREIGN PATENT DOCUMENTS

DE    2845615 A    10/1978
GB    2011911 A    7/1979

OTHER PUBLICATIONS

Bergbreiter, David E. et al. Tetrahedron Letters vol. 32(24) pp. 2731-2734 (1991).*
PCT Search Report dated Feb. 9, 2015, from PCT counterpart Application No. PCT/2014/070261.
PCT IPRP dated Jul. 19, 2016; from PCT counterpart Application No. PCT/2014/070261.
EP Office Action dated Sep. 21, 2016; from EP counterpart Application No. 14822004.9.
Louis M. Pitet et al "Carboxy-Telechelic Polyolefins by Romp Using Maleic Acid as a Chain Transfer Agent", Macromolecules 2011, 44, 2378-2381.
Henry Martinez et al.; "Carboxy-Telechelic Polyolefins in Cross-Linked Elastomers", Macromolecules, vol. 47, No. 2, Jan. 28, 2014; pp. 479-485.
Takeharu Morita et al; "A Ring Opening Metathesis Polymerization (ROMP) Approach to Carboxyl- and Amino-Terminated Telechelic Poly(butendene)s", Macromoleculars, Amer. Chem. Society, vol. 33, No. 17, (Aug. 22, 2000), pp. 6621-6623.

(Continued)

*Primary Examiner* — Irina S Zemel
*Assistant Examiner* — Jeffrey S Lenihan

(57) ABSTRACT

A process to produce an ionomer comprising reacting alkyl-cis-cyclooctene and cis-cyclooctene in a mole ratio from 1:0 to 0:1, in the presence of a difunctional chain transfer agent under ring opening metathesis polymerization conditions to form an unsaturated polyolefin reactive telechelic pre-polymer; hydrogenating the unsaturated polyolefin reactive telechelic pre-polymer to produce a hydrogenated polyolefin reactive telechelic pre-polymer; reacting the hydrogenated polyolefin reactive telechelic pre-polymer with at least one compound according to the formula $aM^{x+}b(R)^{y}$, wherein M is a metal, x is a charge of M, R is an alkyl, aryl, oxide, or fatty acid, y is a charge of R, a and b are integers of at least 1, and ax+by=0, to form an ionomer is provided. Further provided are ionomers produced thereby.

7 Claims, 4 Drawing Sheets

(56) References Cited

OTHER PUBLICATIONS

Shingo Kobayashi et al; Regio- and Stereoselective Ring-Opening Metathesis Polymerization of 3-Substituted Cyclooctenes, Journal of the American Chemical Society 2011 ACS Publications, vol. 133, No. 15, pp. 5794-5797.
John Carl Falk; "Polymer Hydrogenations with Soluble Lithium/ Cobalt and Aluminum/Cobalt Catalysts", Catalytic in Synthesis, pp. 305-324. Organic.
L.A. Mango, et al. "Hydrogenation of Unsaturated Polymers with Dimide", Die Makromolekulare Chemie 163 (1973), pp. 13-36.
H. James Harwood, et al. "Dimide as a Reagent for the Hydrogenation of Unsaturated Polymers", Die Makromolekulare Chemie 163 (1973), pp. 1-12.
Singo Kobayashi et al.; "Functionalized Linear Low-Density Polyethylene by Ring-Opening Metathesis Polymerization", Polymer Chemistry, vol. 4, No. 4, Jan. 1, 2013; p. 1193-1198.

\* cited by examiner

PROCESS TO PRODUCE POLYOLEFIN IONOMERS AND IONOMERS PRODUCED THEREBY

FIELD OF INVENTION

The instant invention relates to a process to produce polyolefin ionomers and ionomers produced thereby.

BACKGROUND OF THE INVENTION

Polyolefins are useful materials as high molar mass polymers. The high chemical and oxidation resistance coupled with the competitive price of saturated polyolefin materials make polyolefins highly desirable to the plastics industry. It has been demonstrated that controlled inclusion of functional groups on the polyolefins can lead to property enhancements. However, despite the vast number of materials and applications derived from polyolefins, their pre-polymers for the formation of ionically associated polyolefins are an under-explored area. This is primarily because precise and controlled functionalization has been challenging. Most methods for incorporation of reactive groups in polyolefins involve post-polymerization reactions, which generally have poor control over the functionalization location and quantity and leads to diminished mechanical properties. The synthesis of moldable, injectable, and otherwise processable polyolefin reactive telechelic pre-polymers, that form polyolefin ionic associations, would provide a desirable combination of low viscosity and good tensile properties.

SUMMARY OF THE INVENTION

The instant invention is a process to produce polyolefin ionomers and ionomers produced thereby.

In one embodiment, the instant invention provides a process to produce an ionomer comprising reacting alkyl-cis-cyclooctene and cis-cyclooctene in a mole ratio from 0:1 to 1:0 in the presence of a difunctional acidic chain transfer agent under ring opening metathesis polymerization conditions to form an unsaturated polyolefin reactive dicarboxylic acid telechelic pre-polymer; hydrogenating the unsaturated polyolefin reactive dicarboxylic acid telechelic pre-polymer to produce a hydrogenated polyolefin reactive dicarboxylic, telechelic pre-polymer; reacting the hydrogenated polyolefin reactive telechelic pre-polymer with at least one compound according to the formula $aM^x+b(R)^y$, wherein M is a metal, x is a charge of M, R is an alkyl, aryl, oxide, or fatty acid, y is a charge of R, a and b are integers of at least 1, and $ax+by=0$, to form an ionomer.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
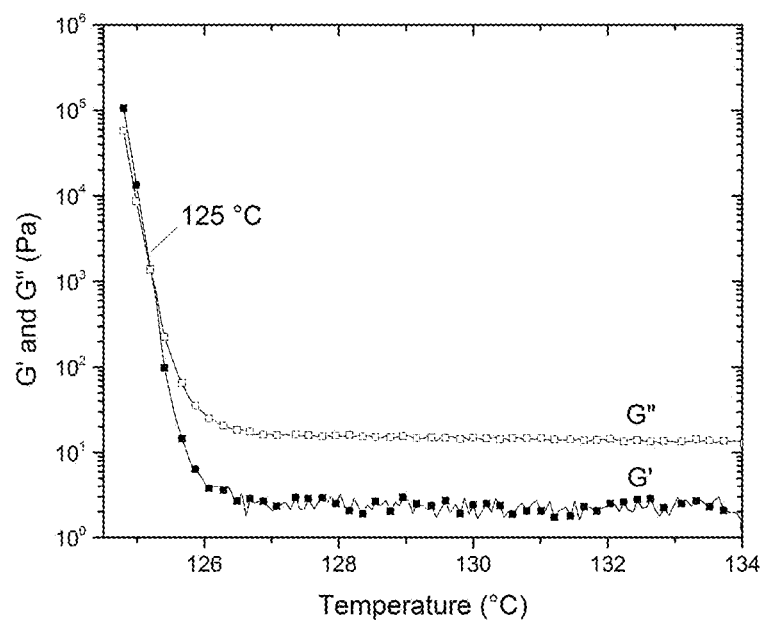
FIG. 1 is a graph illustrating the DMTA of Hydrogenated Pre-polymer 1 taken with 25 mm Parallel Plate Geometry; Temperature ramp 0.5° C. min$^{-1}$; $\omega$=6.28 rad s$^{-1}$ and $\gamma$=0.05%.

The instant invention is a process to produce polyolefin ionomers and ionomers produced thereby.

The process to produce a polyolefin difunctional acid reactive telechelic pre-polymer according to the present invention comprises reacting alkyl-cis-cyclooctene and cis-cyclooctene in a mole ratio from 0:1 to 1:0 in the presence of a difunctional acidic chain transfer agent under ring opening metathesis polymerization conditions to form an unsaturated polyolefin reactive dicarboxylic acid telechelic pre-polymer; hydrogenating the unsaturated polyolefin reactive dicarboxylic acid telechelic pre-polymer to produce a hydrogenated polyolefin reactive dicarboxylic, telechelic pre-polymer; reacting the hydrogenated polyolefin reactive telechelic pre-polymer with at least one compound according to the formula $aM^x+b(R)^y$, wherein M is a metal, x is a charge of M, R is alkyl, aryl, oxide, or fatty acid, y is a charge of R, a and b are integers of at least 1, and $ax+by=0$, to form an ionomer.

In an alternative embodiment, the instant invention further provides an ionomer produced according to any embodiment of the inventive process disclosed herein.

Alkyl-cis-cyclooctenes useful in embodiments of the invention are known in the art. Exemplary alkyl-cis-cyclooctenes include 3-substituted-cis-cyclooctenes, such as 3-methyl-cis-cyclooctene, 3-ethyl-cis-cyclooctene, 3-hexyl-cis-cyclooctene, and 3-phenyl-cis-cyclooctenes.

Any difunctional acidic chain transfer agent known in the art can be used in embodiments of the invention. Difunctional chain transfer agents include, for example, maleic acid, dicarboxylic acid, and mixtures thereof.

Ring opening metathesis polymerization (ROMP) conditions are known in the art and are described for example in "Regio- and Stereoselective Ring-Opening Metathesis Polymerization of 3-Substituted Cyclooctenes," Shingo Kobayashi et al, J. Am. Chem. Soc. 2011, 133, 5794-5797 and "Carboxy-Telechelic Polyolefins by ROMP Using Maleic Acid as a Chain Transfer Agent," Pitet and Hillmyer, Macromolecules 2011, 44, 2378-2381. A wide variety of catalysts are known to be useful in ROMP, including simple metal based compounds, such as a RuCl$_3$/alcohol mixture and more complex Grubbs' catalysts, which includes first and second generation Grubbs' catalysts and Hoveyda-Grubbs catalysts. First generation Grubbs' catalyst is a transition metal carbene complex having the general formula:

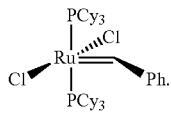

Second generation Grubbs' catalyst have the general formula:

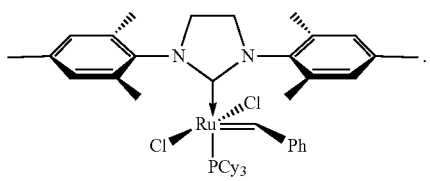

Hoyveda-Grubbs catalysts have the general formula:

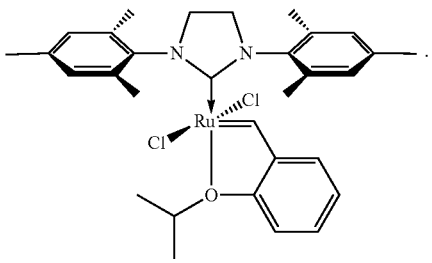

A skilled artisan would understand that any catalyst suitable for ROMP may be used. The invention is not limited by the foregoing catalyst structures or by the use of Ruthenium as the metal for such catalysts.

The process to produce a polyolefin ionomer utilizes a mole ratio of cis-cyclooctene to alkyl-cis-cyclooctene from 1:0 to 0:1. All individual values and subranges from 1:0 to 0:1 are included herein and disclosed herein. For example, the mole ratio of cis-cyclooctene to alkyl-cis-cyclooctene may be in the range from 1:0 to 0:1, or in the alternative, the mole ratio of cis-cyclooctene to alkyl-cis-cyclooctene may be in the range from 1:0.75 to 0.75:1, or in the alternative, the mole ratio of cis-cyclooctene to alkyl-cis-cyclooctene may be in the range from 1:0.5 to 0.5:1, or in the alternative, the mole ratio of cis-cyclooctene to alkyl-cis-cyclooctene may be in the range from 1:0.25 to 0.25:1.

In an alternative embodiment, the instant invention provides a process to produce a polyolefin ionomer and ionomers produced thereby, in accordance with any embodiment disclosed herein, except that the unsaturated and/or hydrogenated polyolefin reactive telechelic pre-polymer has a molar mass from 1 to 20 kg/mole. All individual values and subranges from 1 to 20 kg/mole molar mass are included herein and disclosed herein; for example, the molar mass of the unsaturated polyolefin reactive telechelic pre-polymer can be from a lower limit of 1, 3, 6, 9, 12, 15, or 18 kg/mole to an upper limit of 2, 5, 8, 11, 14, 17 or 20 kg/mole.

In an alternative embodiment, the instant invention provides a process to produce a polyolefin ionomer and ionomers produced thereby, in accordance with any embodiment disclosed herein, except that the unsaturated and/or hydrogenated polyolefin reactive telechelic pre-polymer exhibits one or more of the following properties: (a) a decomposition temperature, $T_d$, of equal to or greater than 310° C.; and (b) a glass transition temperature, Tg, equal to or less than −25° C.

For those embodiments in which the unsaturated and/or hydrogenated polyolefin reactive telechelic pre-polymer exhibits a $T_d$ of equal to or greater than 310° C., all individual values and subranges from equal to or greater than 310° C. are included herein and disclosed herein. For example, the $T_d$ can be from a lower limit of 310° C., or in the alternative, the $T_d$ can be from a lower limit of 320° C., or in the alternative, the $T_d$ can be from a lower limit of 330° C., or in the alternative, the $T_d$ can be from a lower limit of 340° C., or in the alternative, the $T_d$ can be from a lower limit of 350° C.

Where the unsaturated and/or hydrogenated polyolefin reactive telechelic pre-polymer exhibits a glass transition temperature, Tg, equal to or less than −25° C., all individual values and subranges are included herein and disclosed herein. For example, the Tg can be from an upper limit of −25° C., or in the alternative, the Tg can be from an upper limit of −30° C., or in the alternative, the Tg can be from an upper limit of −35° C., or in the alternative, the Tg can be from an upper limit of −40° C. In an alternative embodiment, the unsaturated and/or hydrogenated polyolefin reactive telechelic pre-polymer exhibits a glass transition temperature greater than or equal to −250° C. All individual values and subranges greater than or equal to −250° C. are included herein and disclosed herein. For example, the Tg can range from a lower limit of −250° C., or in the alternative, from a lower limit of −200° C., or in the alternative, from a lower limit of −150° C., or in the alternative, from a lower limit of −100° C.

In an alternative embodiment, the unsaturated polyolefin reactive telechelic pre-polymer exhibits a $\Delta H_m$ of less than 60 J g$^{-1}$ ($2^{nd}$ heat). For embodiments in which the unsaturated polyolefin reactive telechelic pre-polymer exhibits a $\Delta H_m$ of less than 60 J g$^{-1}$ ($2^{nd}$ heat), all individual values and subranges less than 60 J g$^{-1}$ are included herein and disclosed herein. For example, the $\Delta H_m$ can be less than 60 J g$^{-1}$, or in the alternative, the $\Delta H_m$ can be less than 51 J g$^{-1}$, or in the alternative, the $\Delta H_m$ can be less than 46 J g$^{-1}$, or in the alternative, the $\Delta H_m$ can be less than 41 J g$^{-1}$.

In an alternative embodiment, the hydrogenated polyolefin reactive telechelic pre-polymer exhibits a $\Delta H_m$ of equal to or less than 277 J g$^{-1}$ ($2^{nd}$ heat). For embodiments in which the hydrogenated polyolefin reactive telechelic pre-polymer exhibits a $\Delta H_m$ of equal to or less than 277 J g$^{-1}$ ($2^{nd}$ heat), all individual values and subranges equal to or less than 277 J g$^{-1}$ are included herein and disclosed herein. For example, the $\Delta H_m$ can be equal to 277 J g$^{-1}$, or in the alternative, the $\Delta H_m$ can be less than 277 J g$^{-1}$, or in the alternative, the $\Delta H_m$ can be less than 200 J g$^{-1}$, or in the alternative, the $\Delta H_m$ can be less than 150 J g$^{-1}$, or in the alternative, the $\Delta H_m$ can be less than 100 J g$^{-1}$. In an alternative embodiment, the hydrogenated polyolefin reactive telechelic pre-polymer which exhibits a $\Delta H_m$ of greater than or equal to 0 J g$^{-1}$, or in the alternative, the $\Delta H_m$ of greater than or equal to 10 J g$^{-1}$, or in the alternative, the $\Delta H_m$ of greater than or equal to 20 J g$^{-1}$, or in the alternative, the $\Delta H_m$ of greater than or equal to 30 J g$^{-1}$, or in the alternative, the $\Delta H_m$ of greater than or equal to 50 J g$^{-1}$.

In an alternative embodiment, the instant invention provides a process to produce a polyolefin ionomer and ionomers produced thereby, in accordance with any embodiment disclosed herein, except that the hydrogenating is catalytic hydrogenation and occurs in the presence of a hydrogenation catalyst. Hydrogenation catalysts are well known in the art.

In a particular embodiment, the hydrogenation catalyst is a catalyst which provides a saturation of at least 90% and which results in a hydrogenated polyolefin reactive telechelic pre-polymer having at least 1.7 functionalities per pre-polymer chain. All individual values and subranges from a lower limit of 1.7 functionalities per pre-polymer chain are included herein and disclosed herein. For example, the functionalities can be from a lower limit of 1.7, 1.8, 1.9, or 2.0 functionalities per pre-polymer chain. In an alternative embodiment, the a hydrogenated polyolefin reactive telechelic pre-polymer equal to or less than 10 functionalities per pre-polymer chain, or in the alternative, from equal to or less than 7 functionalities per pre-polymer chain, or in the alternative, from equal to or less than 4 functionalities per pre-polymer chain.

In an alternative embodiment, the instant invention provides a process to produce a polyolefin ionomer and ionomers produced thereby, in accordance with any embodiment disclosed herein, except that at least 60% of the functionalities remain following hydrogenation. All individual values and subranges from at least 60% are included herein and disclosed herein. For example, the percentage of functionalities remaining after hydrogenation can range from a lower limit of 60, 70, 80, 90 or 95.

In an alternative embodiment, the instant invention provides a process to produce a polyolefin ionomer and ionomers produced thereby, in accordance with any embodiment disclosed herein, except that the hydrogenating results in at least 90% of the unsaturations present in the pre-polymer being hydrogenated. All individual values and subranges from at least 90% are included herein and disclosed herein; for example, the hydrogenation level can be from a lower limit of 90, 92.5, 95, or 97%.

Both homogeneous and heterogeneous catalyst systems have been widely used for the hydrogenation of ethylenically unsaturated polymers. Homogeneous catalytic processes are disclosed in U.S. Pat. Nos. 3,595,295; 3,595,942; 3,700,633 and 3,810,957, the disclosures of which are incorporated herein by reference, as well as in "Polymer Hydrogenations With Soluble Lithium/Cobalt And Aluminum/Cobalt Catalysts"; J. C. Falck, Catalysis In Organic Synthesis, E. D. P N Rylander and H. Greenfield, Academic Press, New York, 1976, pp. 305-24. Heterogeneous catalysts are disclosed in U.S. Pat. Nos. 3,333,024; and 3,415,789, the disclosures of which are incorporated herein by reference; Belgium Patent BE871348 and British Patent GB 2,011,911.

In an alternative embodiment, the instant invention provides a process to produce a polyolefin ionomer and ionomers produced thereby, in accordance with any embodiment disclosed herein, except that the hydrogenating is catalytic hydrogenation at temperatures from 50 to 80° C. and pressures of 350 to 500 psi wherein the catalyst is a silica supported platinum catalyst. All individual values and subranges from 50 to 80° C. are included herein and disclosed herein; for example the temperature of the catalytic hydrogenation can be from a lower limit of 50, 55, 60, 65, 70, or 75° C. to an upper limit of 52, 57, 63, 68, 72, 77, or 80° C. For example, the temperature of the catalytic hydrogenation may range from 50 to 80° C., or in the alternative, the temperature of the catalytic hydrogenation may range from 65 to 80° C., or in the alternative, the temperature of the catalytic hydrogenation may range from 50 to 68° C., or in the alternative, the temperature of the catalytic hydrogenation may range from 60 to 75° C. All individual values and subranges from 350 to 500 psi are included herein and disclosed herein; for example the pressure of the catalytic hydrogenation can be from a lower limit of 350, 400, or 450 psi to an upper limit of 375, 425, 475 or 500 psi. For example, the pressure of the catalytic hydrogenation can range from 350 to 500 psi, or in the alternative, the pressure of the catalytic hydrogenation can range from 425 to 500 psi, or in the alternative, the pressure of the catalytic hydrogenation can range from 350 to 425 psi, or in the alternative, the pressure of the catalytic hydrogenation can range from 380 to 475 psi.

In an alternative embodiment, the instant invention provides a process to produce a polyolefin ionomer and ionomers produced thereby, in accordance with any embodiment disclosed herein, except that the hydrogenating is chemical hydrogenation. Chemical hydrogenation is known in the art and described for example in Die Makromoleculare Chemie, 163, 1 (1973) and Die Makromolekulare Chemie, 163, 13 (1973). In chemical hydrogenation, hydrogen is extracted ("transferred") from "hydrogen-donors" in place of $H_2$ gas. Hydrogen donors, which often serve as solvents include hydrazine, dihydronaphthalene, dihydroanthracene, isopropanol, and formic acid.

EXAMPLES

The following examples illustrate the present invention but are not intended to limit the scope of the invention.

Materials

Cis-Cyclooctene was purchased from Fisher Scientific and purified by redistillation. Grubbs second generation (G2) catalyst, ethyl vinyl ether, and maleic acid were purchased from Sigma-Aldrich and used as received. Pt/Silica supported catalyst were obtained from The Dow Chemical Company and used as received. The Pt/Silica supported catalyst is described in U.S. Pat. Nos. 5,028,665; 5,612,422; 5,654,253; 6,090,359; 6,399,538; 6,376,622; and 6,395,841, the disclosures of which are incorporated herein by reference. 3-Hexyl-cis-cyclooctene was synthesized using the procedure disclosed in Kobayashi, S.; Pitet, L. M.; Hillmyer, M. A. J. Am. Chem. Soc. 2011, 133, 5794. Tetrahydrofuran for polymerization and cyclohexane for catalytic hydrogenation were purified with an M. Braun (Stratham, N.H.) solvent purification system.

Polymerization of cis-cyclooctene to Produce Unsaturated Pre-Polymer 1

Following the general copolymerization procedure, Maleic Acid (71.9 mg, 0.62 mmol), cis-cyclooctene (2.5 g, 22.7 mmol), G2 (4.8 mg, 5.6 µmol) and anhydrous THF (10 mL) were mixed. Upon isolation, a solid, white-off polymer was obtained (96%).

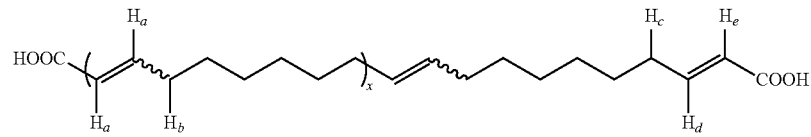

$^1$H NMR (500 MHz, CDCl$_3$, ppm): δ 7.08 (H$_d$, dt, J=15.57, 7.04 Hz), 5.82 (H$_e$, d, J=15.58), 5.46-5.26 (H$_a$, broad), 2.23 (H$_c$, m), 1.82-2.13 (H$_b$, bm), 1.10-1.55 (CH$_2$'s, broad).

$^{13}$C NMR (125 MHz, CDCl$_3$, ppm): repeat unit –δ 130.4 (Trans), 129.9 (Cis), 32.6, 29.77, 29.66, 29.20, 29.10, 29.06, 27.23.

Copolymerization of cis-cyclooctene and 3-hexyl-cis-cyclooctene in 1:1 Molar Ratio with Maleic Acid as Chain Transfer Agent to Produce Unsaturated Pre-Polymer 2

Following the general copolymerization procedure, Maleic Acid (87.8 mg, 0.76 mmol), cis-cyclooctene (1.10 g, 10 mmol), 3-hexyl-cis-cyclooctene (1.94 g, 10 mmol), G2 (4.2 mg, 4.9 μmol) and anhydrous THF (10 mL) were mixed. Upon isolation, a viscous, light-yellow polymer having the structure shown below was obtained (93%) and then characterized by $^1$H NMR, $^{13}$C NMR, SEC and DSC.

$M_n$(NMR,)=4.2 kg·mol$^{-1}$; $M_w$ (LS, THF)=8.3 kg·mol$^{-1}$; Đ (dRI, THF)=1.9.

Non-crystalline polymer, Tg=–61° C.

Table 1 provides the molecular weight, glass transition temperatures, melting temperatures, crystallization temperatures, ΔH$_c$ (heat of crystallization), and decomposition temperatures for each of Inventive Unsaturated Pre-Polymers 1-3.

TABLE 1

|  | $M_n$ (kg mol$^{-1}$) | $T_g$ (° C.) | $T_m$ (° C.) | $T_c$ (° C.) | ΔH$_c$ (J g$^{-1}$) | $T_d$ (° C.) |
|---|---|---|---|---|---|---|
| Unsaturated Pre-Polymer 1 | 4.4 | Not observed | 62 | 51 | 56 | 406 |

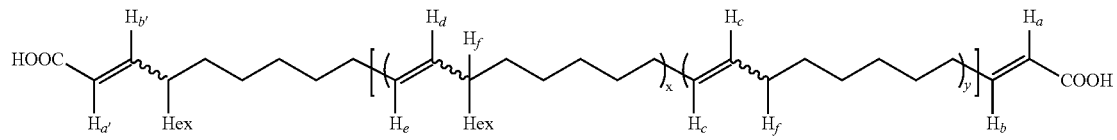

$^1$H NMR (500 MHz, CDCl$_3$, ppm): δ 7.08 (H$_b$, dt, J=15.57, 7.04 Hz), 6.82 (H$_b$, dd, J=15.77, 9.7 Hz), 5.82 (H$_a$, d, J=15.58), 5.77 (H$_a$, d, J=15.65 Hz), 5.38-5.26 (H$_c$, H$_e$, broad), 5.09-5.04 (H$_d$, m), 2.25 (CH$_2$—CH$_b$, m), 2.09-1.80 (H$_f$, bm), 1.55-1.10 (CH$_2$'s), 0.88 (CH$_3$, t, J=6.75 Hz).

$^{13}$C NMR (125 MHz, CDCl$_3$, ppm): repeat unit –δ 135.2 (C—H$_d$), δ 130.5 (trans) (C—H$_c$), 130.1 (cis) (C—H$_c$), 130.0 (C—H$_e$) δ 42.8 (CH-Hex), δ 35.6, 32.6, 32.0, 29.8-27.2, 22.7 (CH$_2$'s), δ 14.1 (CH$_3$). End group δ 152.4 (CO).

$M_n$(NMR,)=5.0 kg·mol$^{-1}$; $M_w$ (LS, THF)=10.4 kg·mol$^{-1}$; Đ (dRI, THF)=2.1.

Non-crystalline polymer, Tg=–66° C.

Copolymerization of cis-cyclooctene and 3-hexyl-cis-cyclooctene in 1:3 Molar Ratio with Maleic Acid as Chain Transfer Agent to Make Unsaturated Pre-Polymer 3

Following the general copolymerization procedure, Maleic Acid (100 mg, 0.86 mmol), cis-cyclooctene (550 g, 5 mmol), 3-hexyl-cis-cyclooctene (2.91 g, 15 mmol), G2 (4.2 mg, 4.9 μmol) and anhydrous THF (10 mL) were mixed. Upon isolation, a viscous, light-yellow polymer having the structure shown below was obtained (87%) and was then characterized by $^1$H NMR, $^{13}$C NMR, SEC and DSC.

TABLE 1-continued

|  | $M_n$ (kg mol$^{-1}$) | $T_g$ (° C.) | $T_m$ (° C.) | $T_c$ (° C.) | ΔH$_c$ (J g$^{-1}$) | $T_d$ (° C.) |
|---|---|---|---|---|---|---|
| Unsaturated Pre-Polymer 2 | 5.0 | –66 | NM* | NM | NM | 348 |
| Unsaturated Pre-Polymer 3 | 4.2 | –61 | NM | NM | NM | 378 |

*NM indicates not measured or not measurable.

Synthesis of carboxy-telechelic Low Density Polyethylene (LDPE). Hydrogenation of Unsaturated Pre-Polymers General Hydrogenation Conditions In a high pressure reactor (Pressure Products Industries, Inc.) was placed 1.2 g of Pt/Silica supported catalyst. The reactor was sealed and the catalyst dried under vacuum at 80° C. for 3 hr. The reactor was then filled with argon (550 Pa) and allowed to cool to room temperature. A solution containing 12 g of polyolefin in 150 ml of cyclohexane was added to the reactor. While stirring, the reactor was charged with 2.4 MPa of H$_2$ and then heated to 50-55° C. for 1.5 h.

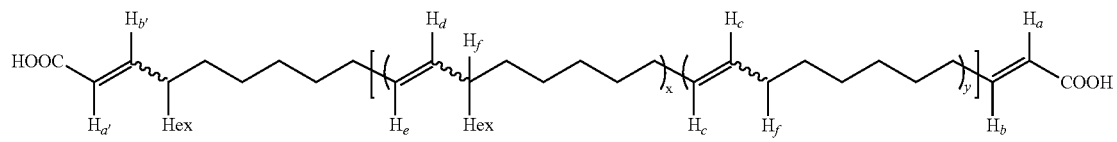

$^1$H NMR (500 MHz, CDCl$_3$, ppm): δ 7.08 (H$_b$, dt, J=15.57, 7.04 Hz), 6.85 (H$_b$, dd, J=15.77, 9.7 Hz), 5.82 (H$_a$, d, J=15.55), 5.77 (H$_a$, d, J=15.50 Hz), 5.38-5.25 (H$_c$, H$_e$, broad), 5.10-4.98 (H$_d$, m), 2.23 (CH$_2$—CH$_b$, m), 2.07-1.78 (H$_f$, bm), 1.51-1.07 (CH$_2$'s), 0.89 (CH$_3$, t, J=6.75 Hz).

$^{13}$C NMR (125 MHz, CDCl$_3$, ppm): repeat unit –δ 135.1 (C—H$_d$), δ 130.4 (trans) (C—H$_c$), 130.0 (C—H$_c$) δ 42.8 (CH-Hex), δ 35.6, 32.6, 32.0, 29.8-27.2, 22.7 (CH$_2$'s), δ 14.1 (CH$_3$).

After this time, the reactor temperature was increased to 80° C.; after the system had equilibrated at this temperature, the reactor was charged additional hydrogen, to a pressure of 3.4 MPa of H$_2$. After 15 h (total 16.5 h) the system was cooled to room temperature, purged once with argon and the reactor disassembled. The solution was filtrated using a millipore (0.45 micrometer HVHP membrane), concentrated to half of the original volume, and precipitated into 1 L of room temperature methanol. The solution was stirred for 1 hour and then the methanol was decanted to leave a solid or viscous liquid polymer. Viscous polymers were dissolved in a minimum amount of $CH_2Cl_2$ and then transferred to a glass vial. The solvent was removed and the polymer dried under high vacuum at 70° C. The dried polymers were characterized by $^1H$ NMR, $^{13}C$ NMR, SEC, TGA and DSC.

Hydrogenation of Unsaturated Pre-Polymer 1 to Produce Hydrogenated Pre-Polymer 1

Unsaturated Pre-Polymer 1 was hydrogenated as previously described. An off-white solid material was obtained in 95% yield. >99% olefin hydrogenation and >1.99 acid functionalization.

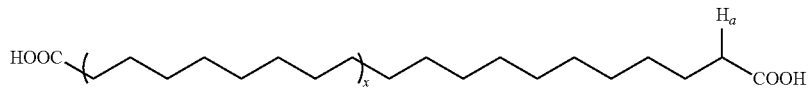

$^1H$ NMR (500 MHz, $ClCD_2CD_2Cl$, ppm): δ 2.38 ($H_a$, t, J=7.10 Hz), δ 1.33 ($CH_2$'s, broad).

Hydrogenation of Unsaturated Pre-Polymer 2 to Produce Hydrogenated Pre-Polymer 2

Unsaturated Pre-Polymer 2 was hydrogenated as previously described. A colorless, low melting, waxy material was obtained in 93% yield. >99% olefin hydrogenation and >1.99 acid functionalization.

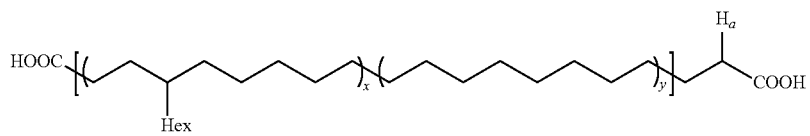

$^1H$ NMR (500 MHz, $CDCl_3$, ppm): δ 2.35 ($H_a$, t, J=7.40 Hz), 1.40-δ 1.10 ($CH_2$'s, CH's, bm), δ 0.88 ($CH_3$, t, J=7.05 Hz).

$^{13}C$ NMR (125 MHz, $CDCl_3$, ppm): δ 37.6, 33.7, 32.0, 30.2, 29.9, 29.8, 26.7, 26.7, 22.7, 14.3.

Hydrogenation of Unsaturated Pre-Polymer 3 to Produce Hydrogenated Pre-Polymer 3

Unsaturated Pre-Polymer 3 was hydrogenated as previously describe. A colorless, viscous material was obtained in 90% yield. 98% olefin hydrogenation and >1.95 acid functionalization.

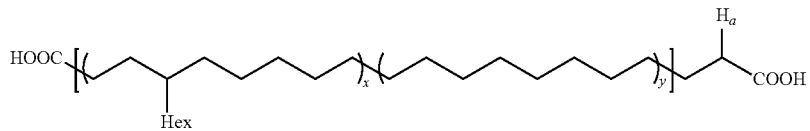

$^1H$ NMR (500 MHz, $CDCl_3$, ppm): δ 2.35 ($H_a$, t, J=7.40 Hz), 1.40-δ 1.15 ($CH_2$'s, CH's, bm), δ 0.89 ($CH_3$, t, J=7.05 Hz).

$^{13}C$ NMR (125 MHz, $CDCl_3$, ppm): δ 37.6, 33.7, 32.0, 30.2, 29.9, 29.8, 26.7, 26.7, 22.7, 14.2.

Synthesis of Al and Zn Ionomers from Hydrogenated Pre-Polymers: General Procedure Al(+3) and Zn(2+) ionomers were prepared from the hydrogenated pre-polymers according to the reaction scheme shown below:

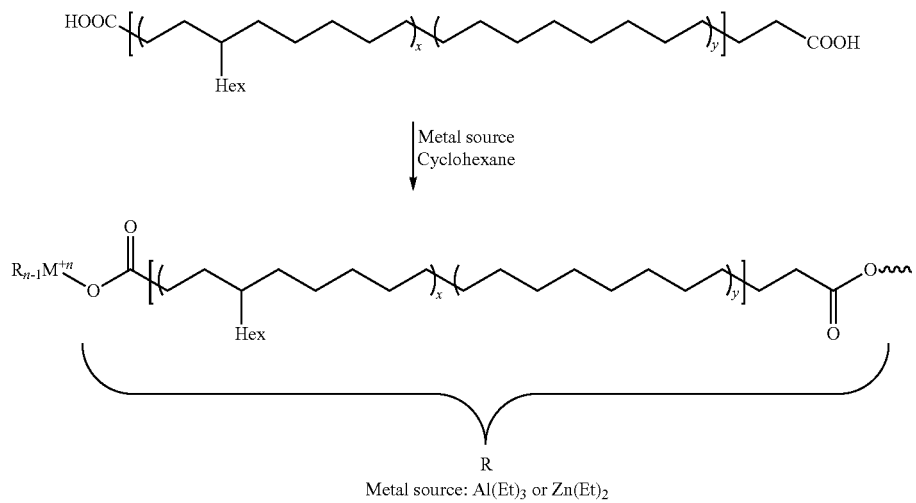

Metal source: Al(Et)₃ or Zn(Et)₂

The Metal alkyl reagents (Al(Et)₃ or Zn(Et)₂) 1M solution in Hexanes were purchased from Sigma-Aldrich and used as received. In a round bottom flask with a stir magnetic bar was added 0.23 mmols of carboxy-telechelic pre-polymer and 10 ml of anhydrous cyclohexane (for Hydrogenated Pre-Polymer 2 and Hydrogenated Pre-Polymer 3) or toluene (for Hydrogenated Pre-polymer 1). The flask was covered with a septa and stirred until all polymer was dissolved (room temperature for Hydrogenated Pre-Polymer 2 and Hydrogenated Pre-polymer 3 prepolymers; 95° C. for Hydrogenated Pre-polymer 1). The system was purged with argon for 20 minutes. Under argon atmosphere 155 μL (0.155 mmol) of Metal alkyl reagent (1M in Hexanes) were added to the solution in one shot. The solution became highly viscous within 30 seconds. The solution was left under stirring for an additional 30 min. The solvent was removed under high vacuum to yield a clear, colorless solid or highly viscous liquid (99% yield). The material was characterized by DSC, TGA, IR and Dynamic Mechanical Thermal Analysis (DMTA).

IR spectroscopy shows complete depletion of the acid-OH stretch and the carbonyl (C=O) stretch shifted to a lower frequency (1600 cm⁻¹). The polymers were insoluble in most common organic solvents (THF, $CH_2Cl_2$ and Hexanes). Gel fraction ($CH_2Cl_2$)=0.99.

Synthesis of Al(+3) Ionomer with Hydrogenated Pre-Polymer 1 to Produce Inventive Example 1

Thermal gravimetrical analysis (TGA) of Inventive Example 1 displayed good thermal stability with 5% weight loss at 439° C. Differential Scanning calorimetry showed a $T_m$ 132° C. $T_c$: 117° C. $\Delta H_c$: 226 J.g⁻¹. Cross temperature by DMTA: 119° C.

Synthesis of Al(+3) Ionomer with Hydrogenated Pre-Polymer 2 to Produce Inventive Example 2

Thermal gravimetrical analysis (TGA) of Inventive Example 2 displayed good thermal stability with 5% weight loss at 403° C. Differential Scanning calorimetry showed a $T_g$=−51° C., $T_m$: −35-59° C. $T_c$: 10° C. $\Delta H_c$: 10 J.g⁻¹. Cross temperature by DMTA: 71° C.

Synthesis of Al(+3) Ionomer with Hydrogenated Pre-Polymer 3 to Produce Inventive Example 3

Thermal gravimetrical analysis (TGA) of Inventive Example 3 displayed good thermal stability with 5% weight loss at 401° C. Differential Scanning calorimetry showed a $T_g$=−64° C. Cross temperature by DMTA: 70° C.

Zn(+2) Ionomer with Hydrogenated Pre-Polymer 2 to Produce Inventive Example 4

Thermal gravimetrical analysis (TGA) of Inventive Example 4 displayed good thermal stability with 5% weight loss at 410° C. Differential Scanning calorimetry showed a $T_g$=−55° C., $T_m$: −35-59° C. $T_c$: 16° C. $\Delta H_c$: 10 J.g⁻¹. Cross temperature by DMTA: 31° C.

Zn(+2) Ionomer with Hydrogenated Pre-Polymer 3 to Produce Inventive Example 5

Thermal gravimetrical analysis (TGA) of Inventive Example 5 displayed good thermal stability with 5% weight loss at 387° C. Differential Scanning calorimetry showed a $T_g$=−65° C. Cross temperature by DMTA: 1° C.

TABLE 2

| | $T_g$ (° C.) | $T_m$ (° C.) | $\Delta H_c$ (J g⁻¹) | Crystallinity (%) | Crossover Temp. (° C.) | $T_d$ (° C.) |
|---|---|---|---|---|---|---|
| Hydrogenated Pre-polymer 1 | Not observed | 135 | 247 | 89 | 125 | 412 |
| Hydrogenated Pre-Polymer 2 | −61 | −38-58 | 10 | 3.6 | 18 | 330 |
| Hydrogenated Pre-polymer 3 | −68 | NM | 0 | 0 | −34 | 344 |
| Inv. Ex. 1 | Not observed | 132 | 226 | 82 | 119 | 439 |
| Inv. Ex. 2 | −51 | −35-59 | 10 | 3.6 | 71 | 403 |
| Inv. Ex. 3 | −64 | NM | 0 | 0 | 70 | 401 |
| Inv. Ex. 4 | −55 | −35-59 | 10 | 3.6 | 31 | 410 |
| Inv. Ex. 5 | −65 | NM | 0 | 0 | 1 | 387 |

Aluminum ionomers, Inventive Examples 1-3 were insoluble in most common organic solvents (THF, $CH_2Cl_2$ and Hexanes). Gel fraction ($CH_2Cl_2$)=0.96-0.99.

Figure 2:
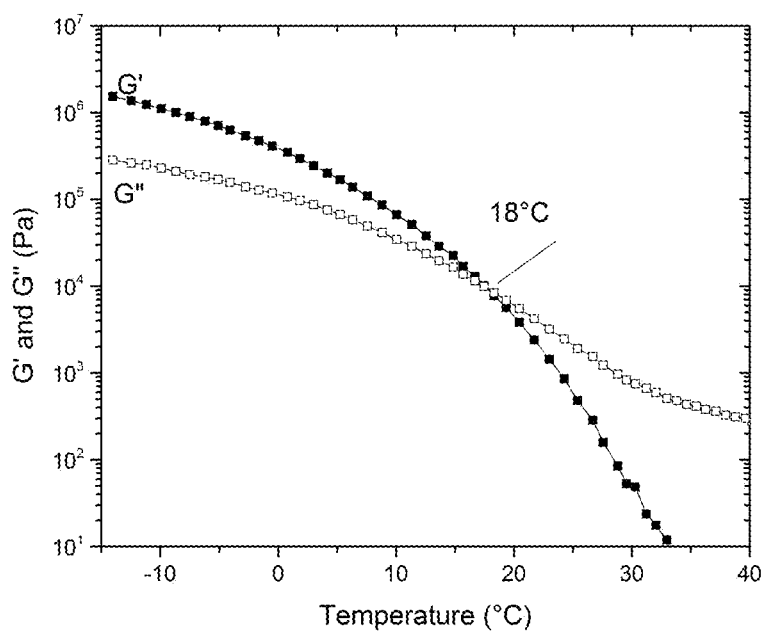
FIG. 2 is a graph illustrating the DMTA of Hydrogenated Pre-polymer 2 taken with 25 mm Parallel Plate Geometry; Temperature ramp 5° C. min$^{-1}$; $\omega$=6.28 rad s$^{-1}$ and $\gamma$=0.05%.
Figure 3:
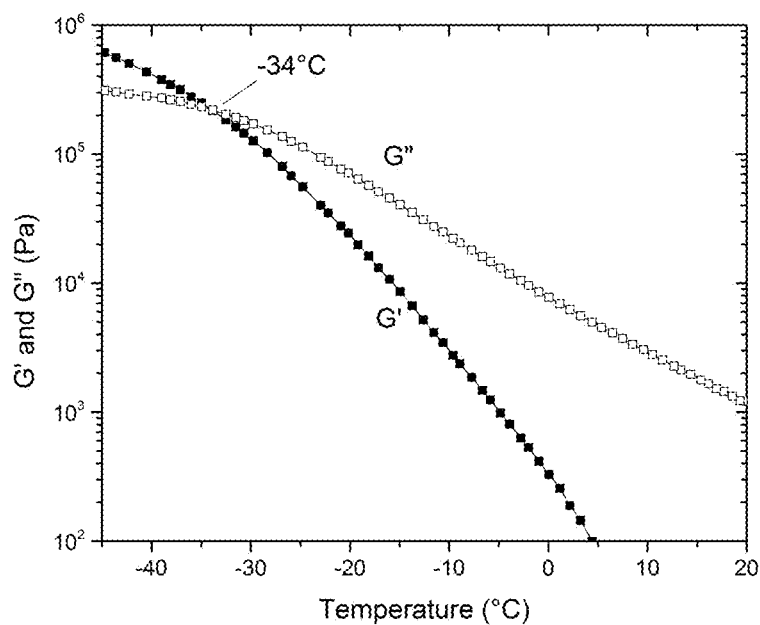
FIG. 3 is a graph illustrating the DMTA of Hydrogenated Pre-polymer 3 taken with 25 mm Parallel Plate Geometry; Temperature ramp 5° C. min$^{-1}$; $\omega$=6.28 rad s$^{-1}$ and $\gamma$=0.05%.
Figure 4:
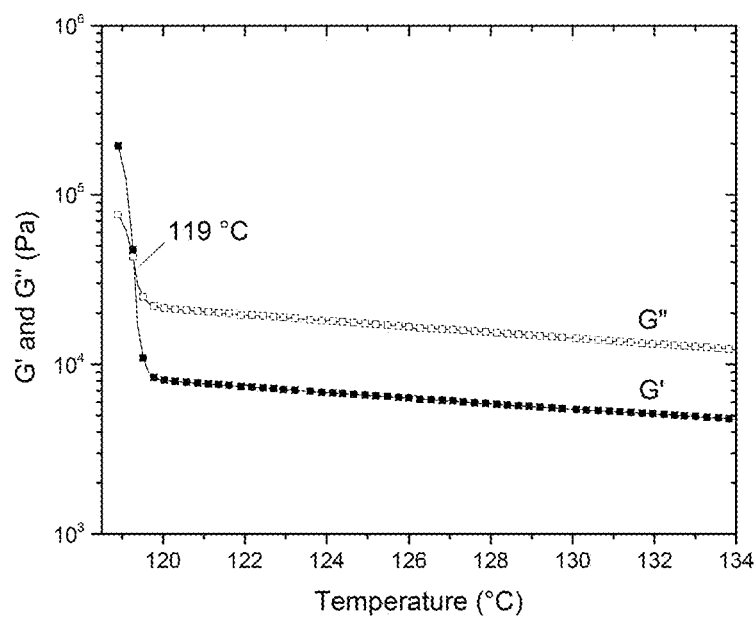
FIG. 4 is a graph illustrating the DMTA of Inventive Example 1 taken with 25 mm Parallel Plate Geometry; Temperature ramp 0.5° C. min$^{-1}$; $\omega$=6.28 rad s$^{-1}$ and $\gamma$=0.05%.
Figure 5:
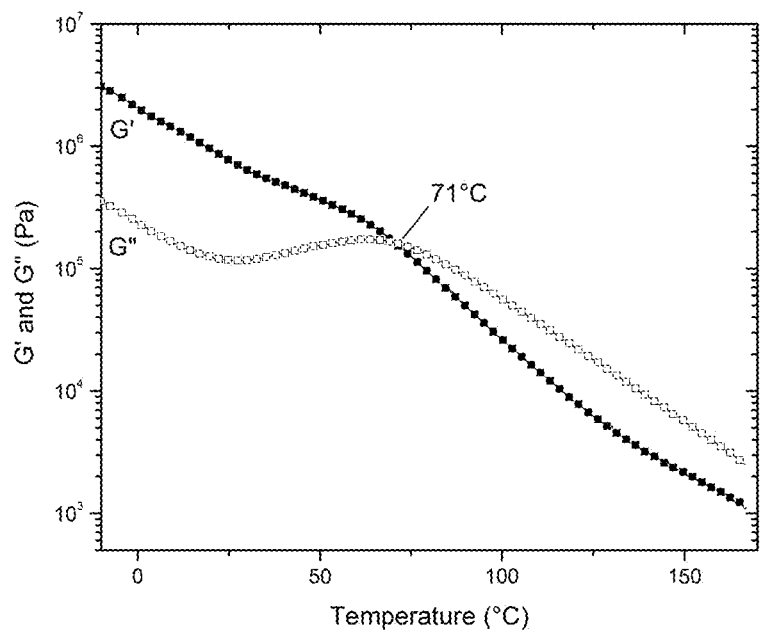
FIG. 5 is a graph illustrating the DMTA of Inventive Example 2 taken with 8 mm parallel plate geometry; Temperature ramp 5° C. min$^{-1}$; $\omega$=6.28 rad s$^{-1}$ and $\gamma$=0.05%.
Figure 6:
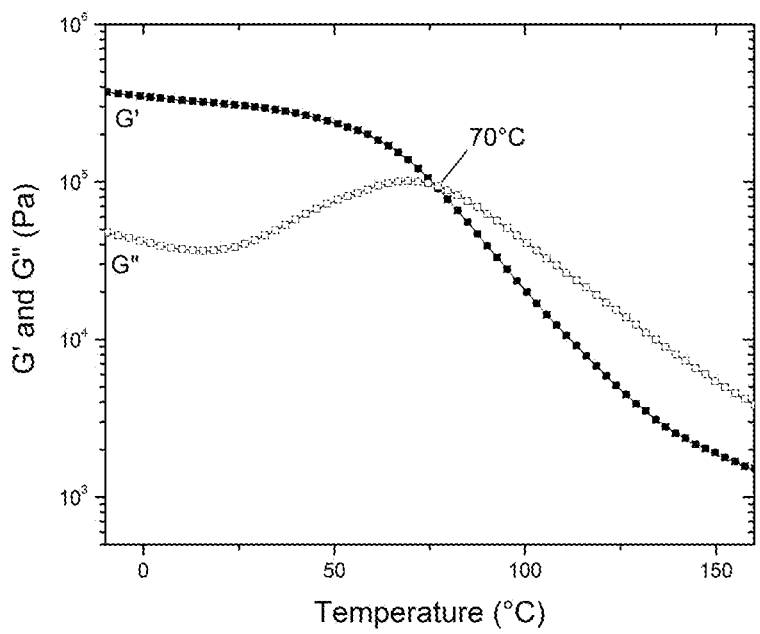
FIG. 6 is a graph illustrating the DMTA of Inventive Example 3 taken with 8 mm parallel plate geometry; Temperature ramp 5° C. min$^{-1}$; $\omega$=6.28 rad s$^{-1}$ and $\gamma$=0.05%.
Figure 7:
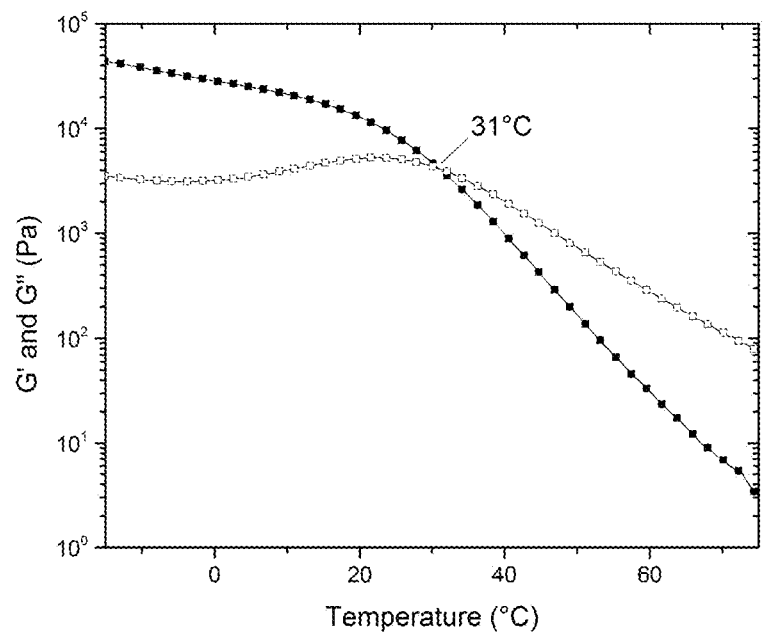
FIG. 7 is a graph illustrating the DMTA of Inventive Example 4 taken with 25 mm parallel plate geometry; Temperature ramp 5° C. min$^{-1}$; $\omega$=6.28 rad s$^{-1}$ and $\gamma$=0.05%.
Figure 8:
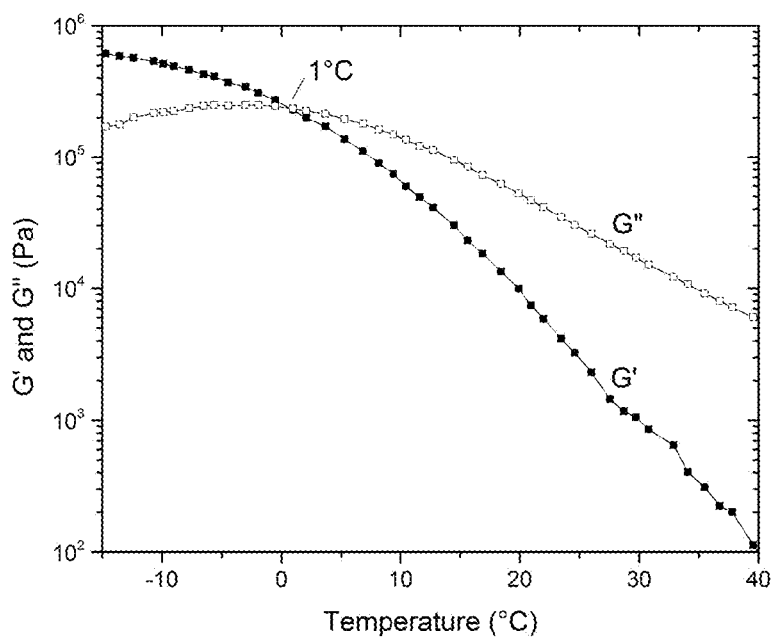
FIG. 8 is a graph illustrating the DMTA of Inventive Example 5 taken with 25 mm parallel plate geometry; Temperature ramp 5° C. min$^{-1}$; $\omega$=6.28 rad s$^{-1}$ and $\gamma$=0.05%.

All Al and Zn ionomers showed a significant increase in the decomposition temperature (5% weight loss determined by TGA at 20° C. min⁻¹ in $N_2$) compared to the corresponding pre-polymer. With the exception of Inventive Example 1, all ionomers (Al and Zn) showed a higher crossover temperature than the corresponding pre-polymer by Dynamic Mechanical Thermal Analysis (DMTA) (FIGS. 1-8). Although Inventive Example 1 showed a lower crossover temperature and crystallinity than the starting Hydrogenated Pre-Polymer 1, Inventive Example 1 showed a much higher shear modulus than Hydrogenated Pre-Polymer 1 at temperatures higher than the crossover temperature.

Table 3 provides certain mechanical properties for Inventive Examples 2 and 3.

TABLE 3

| | Tensile | | |
|---|---|---|---|
| | ε(%) | σ(Mpa) | E(Mpa) |
| Inv. Ex. 2 | 93 ± 4 | 1.10 ± 0.13 | 3.39 ± 0.53 |
| Inv. Ex. 3 | 91 ± 5 | 0.52 ± 0.02 | 1.40 ± 0.07 |

Test Methods

Test methods include the following:

NMR $^1$H and $^{13}$C NMR spectra were recorded on a Bruker AV500 spectrometer at room temperature using $CDCl_3$ as solvent. Proton chemical shifts were referenced to TMS (0.00 ppm). Carbon chemical shifts were referenced to $CDCl_3$ (77.23 ppm).

Number-average molecular weight ($M_n$) was determined by $^1$H NMR end group analysis. Weight-average molecular weight ($M_w$) was determined at 25° C. using a Size Exclusion Chromatography (SEC) instrument with THF as the mobile phase at a flow of 1 mL/min. The SEC instrument used is equipped with a Wyatt Technology DAWN Heleos II multiangle laser light scattering (MALLS). Size exclusion was performed with one Waters Styragel guard column and three successive Waters Styragel columns (HR6, HR4 and HR1), packed with rigid 5 μm styrene divinylbenzene particles. Together these columns provide effective separation of samples in the molecular weight range of 100-10,000,000 g mol$^{-1}$. Polymer dispersity (Ð) was determined with the same SEC instrument but from the RI Wyatt Optilab T-rEX detector.

DSC

Differential Scanning Calorimetry (DSC) was performed on a TA Instruments Discovery DSC calibrated with an indium standard. Samples with a minimum mass of 4 mg were prepared in hermetically sealed aluminum pans and analyzed under $N_2$ with a heating rate of 10° C./min. Thermal transition temperatures were determined from the second heating after annealing above the glass transition or melting point for at least 1 min to erase thermal history.

Specific Gravity

Specific gravities were determined with a density gradient column (isopropanol/ethylene glycol). The column was calibrated using floats of known density and the temperature was regulated at 25° C. Reported density values are averages and standard deviations of 5 samples equilibrated for 1 hour.

Tensile Testing

Tensile strain tests of the ionomers were conducted on a Rheometrics Scientific Minimat Instrument. Tensile properties of ASTM D1708 microtensile bars were tested at strain rate of 127 mm/min; all values are reported as the average and standard deviation of at least four samples.

Dynamic Mechanical Thermal Analysis

Dynamic Mechanical Thermal Analysis (DMTA) was performed by torsion test on a 8 mm parallel plate geometry (for Al-ionomers) or 25 mm parallel plate geometry (for Zn-ionomers) using an ARES-G2 rheometer (TA Instruments). During the experiment temperature was increased −10 to 160° C. (for Inv. Ex. 2) and from −10 to 200° C. (for Inv. Ex. 3) at a rate of 5° C./min. The frequency and strain were constant at 6.28 rad/s and 0.05%, respectively.

The present invention may be embodied in other forms without departing from the spirit and the essential attributes thereof, and, accordingly, reference should be made to the appended claims, rather than to the foregoing specification, as indicating the scope of the invention.

We claim:

1. A process to produce an ionomer comprising:
    reacting alkyl-cis-cyclooctene and cis-cyclooctene in a mole ratio from 1:0.05 to 0.05:1, in the presence of a difunctional acid chain transfer agent under ring opening metathesis polymerization conditions to form an unsaturated polyolefin reactive telechelic pre-polymer;
    hydrogenating the unsaturated polyolefin reactive telechelic pre-polymer to produce a hydrogenated polyolefin reactive telechelic pre-polymer;
    reacting the hydrogenated polyolefin reactive telechelic pre-polymer with at least one compound according to the formula $aM^x+b(R)^y$, wherein M is a metal, x is a charge of M, R is an alkyl, aryl, oxide, or fatty acid, y is a charge of R, a and b are integers of at least 1, and ax+by=0, to form an ionomer.

2. The process according to claim 1, wherein the alkyl-cis-cyclooctene is 3-hexyl-cis-cyclooctene.

3. The process according to claim 1, wherein the chain transfer agent is selected from the group consisting of maleic acid and dicarboxylic acid.

4. The process according to claim 1, wherein the reacting occurs in the presence of a Grubbs catalyst and/or any catalyst suitable for ROMP.

5. The process according to claim 1, wherein the hydrogenating is catalytic hydrogenation at temperatures between 50 and 80° C. and pressures of 350 to 500 psi wherein the catalyst is a silica supported platinum catalyst.

6. The process according to claim 5, wherein the hydrogenating is chemical hydrogenation.

7. An ionomer produced according to the process of claim 1.

* * * * *